United States Patent
Bliss et al.

(10) Patent No.: US 7,610,422 B2
(45) Date of Patent: Oct. 27, 2009

(54) ISOLATION AND TRANSMISSION OF DIGITAL SIGNALS IN INTENDED DIRECTION

(75) Inventors: David Bliss, Loomis, CA (US); Sajol Ghoshal, El Dorado Hills, CA (US)

(73) Assignee: Akros Silicon Inc., Folsom, CA (US)

( * ) Notice: Subject to any disclaimer, the term of this patent is extended or adjusted under 35 U.S.C. 154(b) by 172 days.

(21) Appl. No.: 11/881,205

(22) Filed: Jul. 26, 2007

(65) Prior Publication Data
US 2009/0028173 A1    Jan. 29, 2009

(51) Int. Cl.
*G06F 13/00* (2006.01)
(52) U.S. Cl. ..................... 710/110; 710/105
(58) Field of Classification Search ............... 710/29, 710/31–315; 375/244, 258
See application file for complete search history.

(56) References Cited

U.S. PATENT DOCUMENTS 5,062,101 A * 10/1991 Dejewski .................... 398/98
6,286,074 B1 * 9/2001 Batchelor et al. ............. 710/305
2004/0174819 A1 * 9/2004 Liu et al. ..................... 370/244
2008/0181316 A1 * 7/2008 Crawley et al. ............. 375/258
2008/0279288 A1 * 11/2008 Crawley et al. ............. 375/244

* cited by examiner

*Primary Examiner*—Raymond N Phan
(74) *Attorney, Agent, or Firm*—DLA Piper LLP (US)

(57) ABSTRACT

An interface between two or more integrated circuit devices employs isolation techniques to provide electrical isolation of a digital signal for transmission of the digital signal between a master device and one or more slave devices. Unidirectional isolator channels are utilized to transmit bidirectional digital signals, and a selection of an isolator channel operating in an intended direction is performed by direction control logic. Logic that monitors read and write transactions operates to determine a desired direction of the digital signal and accordingly directs the digital signal through an appropriate isolator channel.

15 Claims, 4 Drawing Sheets

ISOLATION AND TRANSMISSION OF DIGITAL SIGNALS IN INTENDED DIRECTION

BACKGROUND

Isolation of digital signals communicated between devices is needed to reduce safety hazards as well as for noise robustness factors. Shock and fire hazards may result from digital signals that are not isolated. Additionally, excess noise may be introduced into the digital signals as a result of insufficient isolation. Thus, electrical isolation of digital signals being transmitted between devices, while still allowing the digital signal to be transmitted across an interface between the devices, is a necessary requirement.

Interface components, operating to communicate digital signals between devices, may be utilized to isolate the digital signals. Isolator channels are components for electrically isolating digital signals and may be employed in interface components for such a purpose. Isolator channels are uni-directional components, while digital signals may be bi-directional. Thus, one isolator channel may be utilized to transmit a digital signal in one direction, while a second isolator channel is needed to transmit the digital signal in an opposite direction. For example, the first isolator channel may be used for communication from a transmitter to a receiver, while the second isolator channel may be used for communication from the receiver to the transmitter.

When a digital signal reaches an interface between devices, it is necessary to determine the intended direction of the signal to allow for an isolator channel operating in the intended direction to be utilized to electrically isolate the digital signal. Thus, a need exists for a process and component to manage and control the direction of the signal across the interface.

SUMMARY

A digital signal, such as a management data input/output (MDIO) signal, is communicated between two or more devices, such as microprocessors or peripheral devices, across an interface. The interface operates to receive, isolate, and transmit the digital signal. Isolator channels or isolation techniques are employed at the interface to electrically isolate the devices while still allowing the transmission of the digital signal. The isolator channels or isolation techniques are managed by direction control logic, to control the direction of the signal across the interface. Read and write transactions between master and slave devices may be monitored to direct the signal across an appropriate isolation channel.

BRIEF DESCRIPTION OF THE DRAWINGS

The foregoing summary and the following detailed description are better understood when read in conjunction with the appended drawings. Exemplary embodiments are shown in the drawings; however, it is understood that the embodiments are not limited to the specific methods and instrumentalities depicted herein. In the drawings.

DETAILED DESCRIPTION

Figure 1:
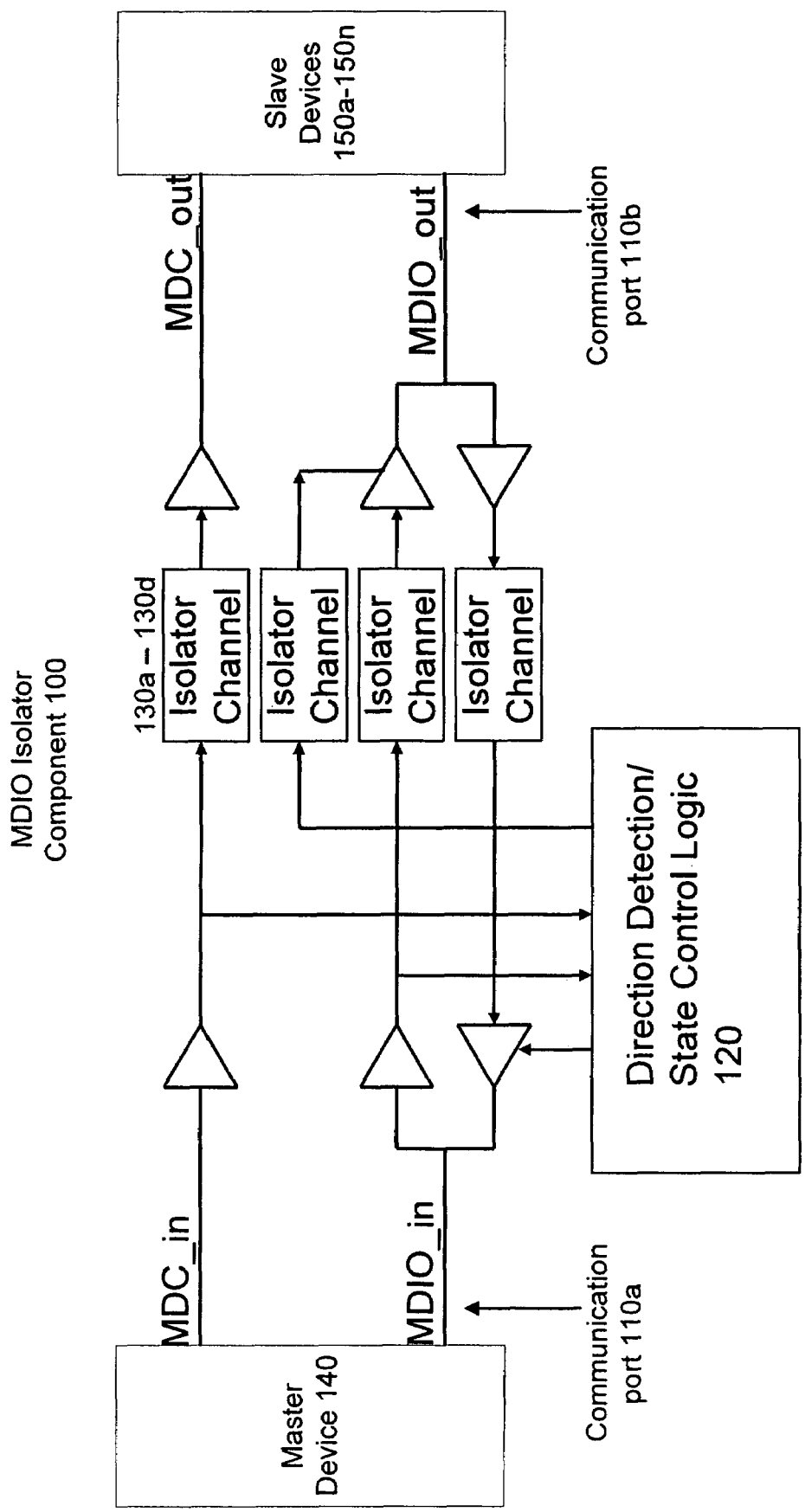
FIG. 1 is a diagram illustrating an exemplary MDIO isolator component.

With reference to FIG. 1, a diagram illustrating an exemplary MDIO isolator component 100 for isolating bi-directional digital signals is shown. This exemplary component may be utilized in MDIO applications in which a digital signal is communicated between one of a plurality of slave devices 150a-150n and a master device 140. The MDIO isolator component 100 may be utilized as an interface between a microprocessor and one or more peripheral chips, between two master peripheral chips, or between any components used for exchange of digital data.

The MDIO isolator component 100 may operate to communicate and electrically isolate a digital signal between two or more devices, such as master device 140 and slave devices 150a-150n. Bi-directional communication ports 110a and 110b may act as the link between the master device 140 and slave devices 150a-150n and the MDIO isolator component 100. The bi-directional communication ports 110a and 110b may operate to transmit and receive the digital signal between the devices 140 and 150a-150n. The digital signal may be a MDIO signal, a serial clock signal, or a serial data signal, for example. Other types of digital signals may be communicated between the devices 140 and 150a-150n across the MDIO isolator component 100. Moreover, the MDIO isolator component 100 may include additional bidirectional communication ports. Two ports, 110a and 110b, are shown only as an exemplary embodiment, as illustrated in FIG. 1.

The MDIO isolator component 100 includes one or more isolator channels 130 for providing electrical isolation between the devices 140 and 150a-150n. Four isolator channels 130a-130d are shown in the exemplary embodiment illustrated in FIG. 1; however, additional or fewer isolator channels 130 may be used. Isolator channels 130a-130d may be uni-directional isolator channels that operate to provide high-volt electrical isolation to digital signals. As the isolator channels 130a-130d are uni-directional components, the digital signals may be bi-directional. Thus, one isolator channel 130a-130d may be utilized to transmit a digital signal in one direction, while a second isolator channel 130a-130d is needed to transmit the digital signal in an opposite direction. The means of isolation may be, but are not limited to, capacitive, magnetic, optical, or acoustical means.

In an exemplary embodiment, a default state may include a transmission of a digital signal from the master device 140 to the slave devices 150a-150n. The default state may be referred to as a write cycle. In the default state, the digital signal may be directly transmitted to an isolator channel 130a-130d for isolation of the digital signal. The isolated digital signal may then be transmitted to one or more of the slave devices 150a-150n.

However, when a digital signal needs to be sent to the master device 140, a read cycle occurs. In this instance, direction detection/control logic 120 may be used to determine an intended transmission direction of the digital signal. Direction detection/control logic 120 may also be utilized to transmit the digital signal over an isolator channel 130a-130d operating in the transmission direction.

Direction detection/control logic 120 may operate to analyze the digital signal to determine an occurrence of a read transaction. Such an occurrence may indicate that the digital signal is being transmitted to the master device 140 from one of the slave devices 150a-150n. The occurrence also indicates that the isolator channel 130a-130d may need to operate in the direction from the slave devices 150a-150n to the master device 140.

For example, direction detection/control logic 120, upon monitoring the data stream between the devices 140 and 150a-150n, detects a read cycle. The digital signal is transmitted through one of the isolator channels 130a-130d operating to isolate the digital signal in the direction from the slave devices 150a-150n to the master device 140. After electrical isolation, the digital signal may be transmitted to the master device 140.

Figure 2:
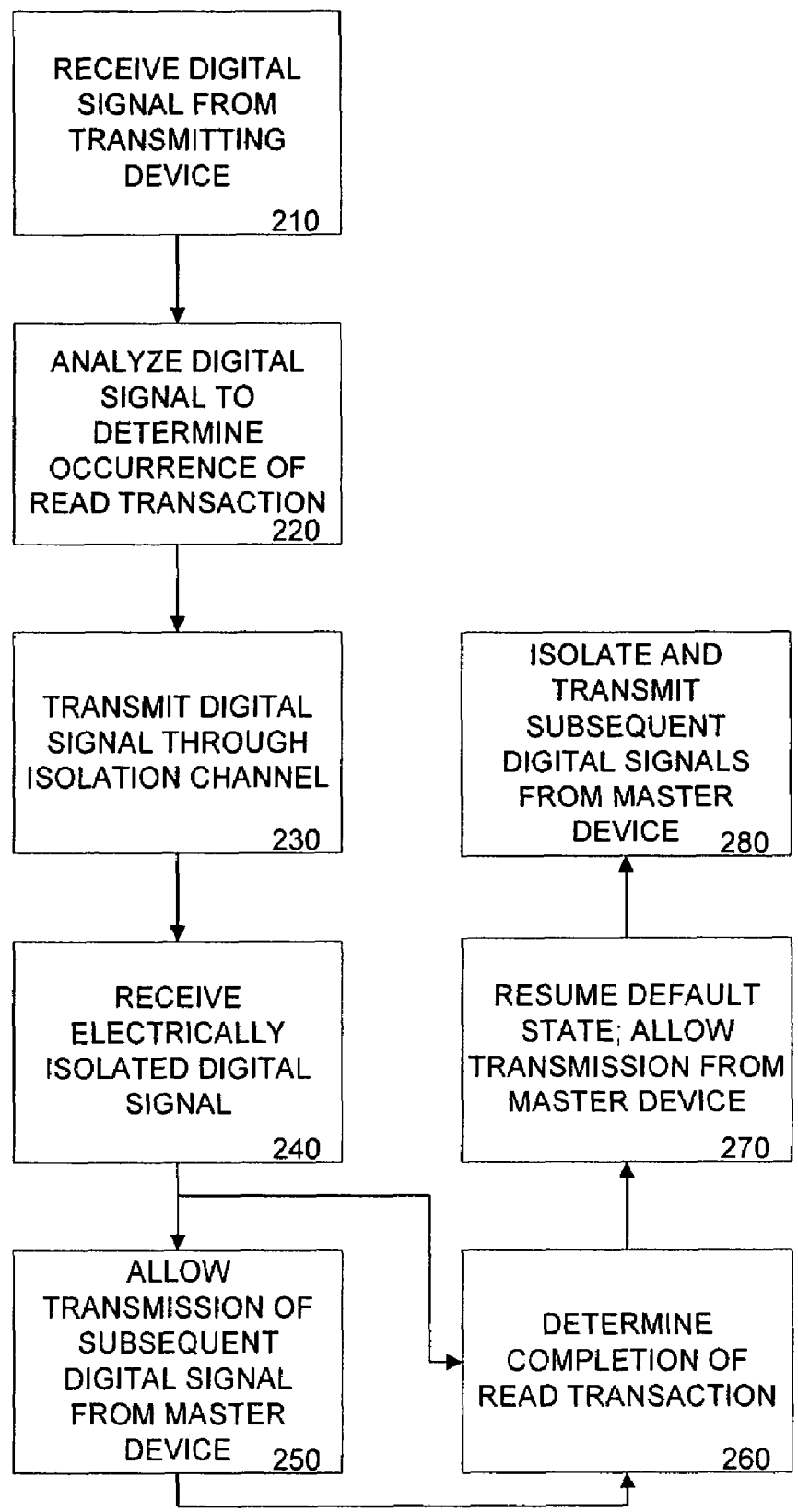
FIG. 2 is a flowchart illustrating an additional exemplary method of communicating a digital signal across an interface.

FIG. 2 is a flowchart illustrating an exemplary method of communicating a digital signal across a MDIO isolator component 100. In the exemplary method, digital signal transmission occurs between a master device 140 and a plurality of slave devices 150a-150n of FIG. 1.

At 210, a digital signal is received from one of devices 140 or 150a-150n. At 220, the digital signal is analyzed to determine an occurrence of a read transaction. The analysis to determine a read transaction occurrence may include analyzing the bits of the digital signal to determine a read transaction.

At 230, upon determination of a read transaction occurrence, the digital signal is transmitted through an isolation channel 130 from one of the slave devices 150a-150n to the master device 140. At 240, the master device 140 receives the digital signal that has been electrically isolated by the isolation channel 130.

At 250, after a predefined number of bits of the isolated digital signal are transmitted, a subsequent digital signal may be communicated from the master device 140, through an isolation channel 130a-130d operating in the transmission direction, to one or more of the plurality of slave devices 150a-150n.

At 260, the digital signal is further analyzed to determine a completion of the read transaction from one of the devices 150a-150n. The determination of the read transaction completion may be performed by the direction detection/control logic 120 by analyzing the bits of the digital signal. A 16-bit read field sent by the MDIO slave device 150a-150n may mark the completion of the read transaction.

After the read transaction is complete, the default state may resume, where digital signals are transmitted from the master device 140 during write cycles to the plurality of slave devices 150a-150n. At 270 a subsequent digital signal is thus transmitted through the isolation channel 130 from the master device 140. At 280, the isolated, subsequent digital signal is transmitted to one or more of the plurality of slave devices 150a-50n.

Figure 3:
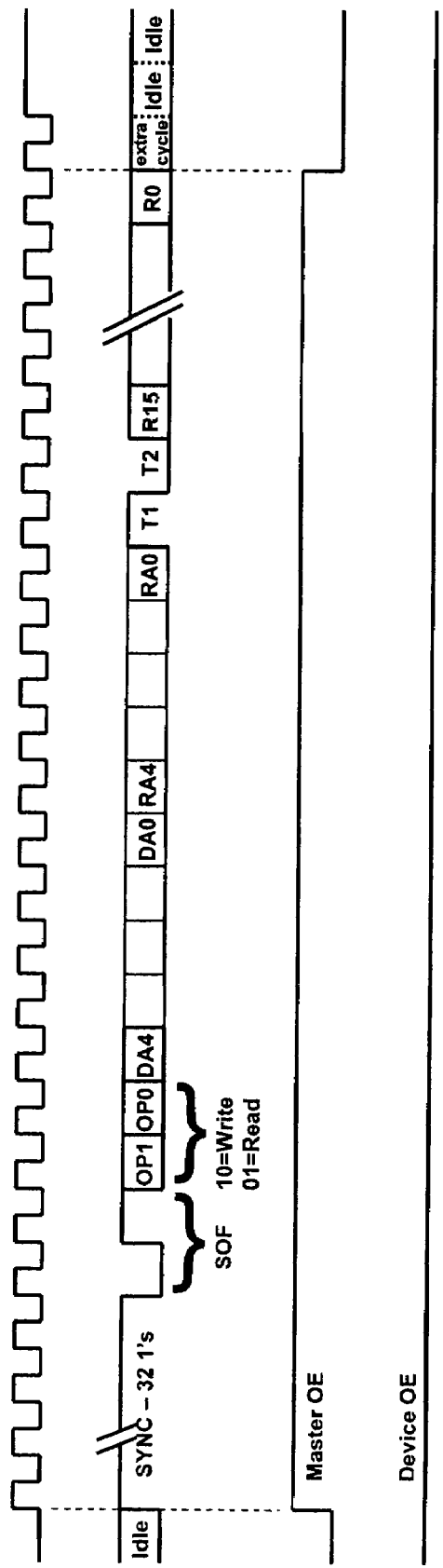
FIG. 3 is a timing diagram illustrating an exemplary frame of a digital signal communicated across an interface between two devices.

FIG. 3 is a timing diagram illustrating an exemplary frame of the digital signal being communicated across the MDIO isolator component 100 of FIG. 1. The exemplary frame illustrates a write cycle, in which the master device 140 is transmitting the digital signal to one or more of the slave devices 150a-150n. The direction detection/control logic 120 examines the OP1 and OP0 bits to determine the direction of the digital signal. In the case of a write transaction, as shown in FIG. 3, the direction detection/control logic 120 assumes the default state of transmitting the digital signal from the master device 140 to one or more of the slave devices 150a-150n after isolating the digital signal through one of the isolator channels 130a-130d operating in the transmission direction.

Figure 4:
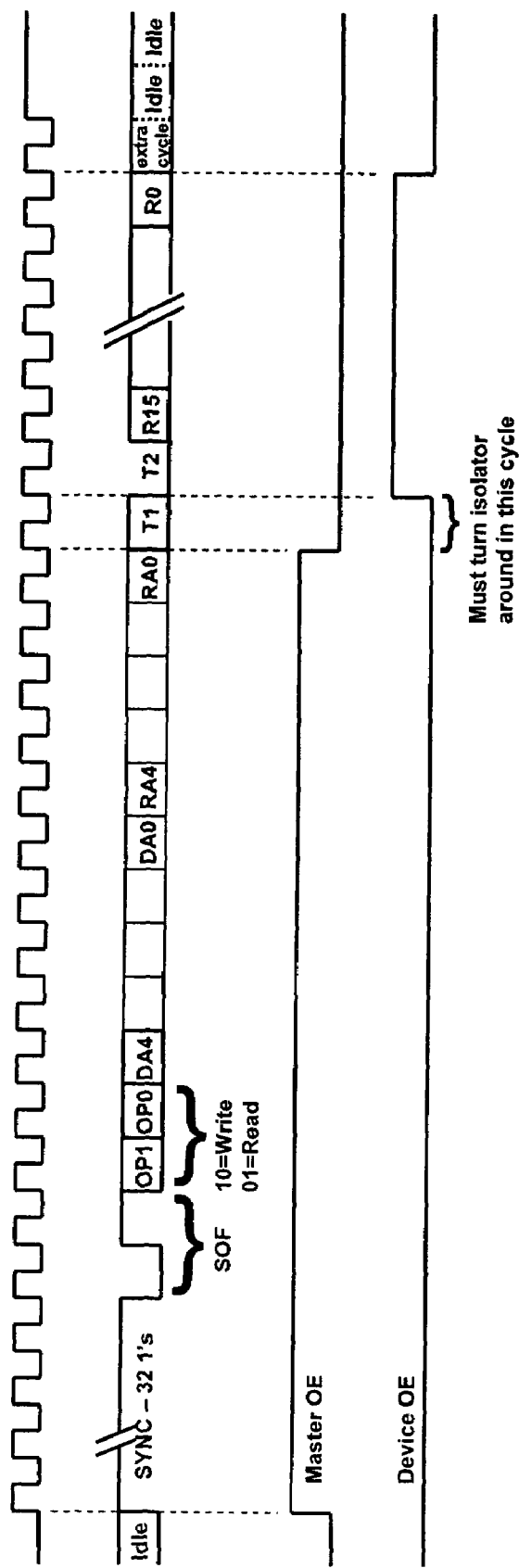
FIG. 4 is an additional timing diagram illustrating another exemplary frame of a digital signal communicated across an interface between two devices.

FIG. 4 is an additional timing diagram illustrating another exemplary frame of the digital signal being communicated across the MDIO isolator component 100 of FIG. 1. The exemplary frame illustrates a read cycle, in which one of the slave devices 150a-150n is transmitting the digital signal to the master device 140. Again, the direction detection/control logic 120 examines the OP1 and OP0 bits to determine the direction of the digital signal. Upon determination of a read transaction, as illustrated in FIG. 4, the direction detection/control logic 120 utilizes one of the isolator channels 130a-130d operating in the direction from the slave devices 150a-150n to the master device 140. The read transaction is complete after the transmission of the 16-bit read field.

The foregoing examples are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

The invention claimed is:

1. A method of communicating and isolating a digital signal across an interface between a master device and a plurality of slave devices, the method comprising:
   receiving the digital signal at the interface;
   analyzing the digital signal to determine an occurrence of a read or a write transaction to determine an intended direction of the digital signal;
   upon determining an occurrence of a read transaction, transmitting the digital signal from one of the plurality of slave devices to an isolation channel configured to isolate the digital signal in the intended direction;
   isolating the digital signal at the isolation channel; and
   transmitting the isolated digital signal in the intended direction of the digital signal to the master device.

2. The method of claim 1, wherein analyzing the digital signal to determine an occurrence of a read or a write transaction comprises analyzing the bits of the digital signal.

3. The method of claim 1, further comprising:
   determining a completion of the read transaction;
   resuming a default state in which subsequent digital signals are sent from the master device to an isolation channel configured to isolate the subsequent digital channels in their intended direction;
   isolating the subsequent digital signals at the isolation channel;
   transmitting the isolated, subsequent digital signals to at least one of the plurality of slave devices; and
   continuing the default state until occurrence of a read transaction.

4. The method of claim 1, further comprising:
   allowing a subsequent digital signal to be communicated from the master device, to an isolation channel configured to isolate the subsequent digital signal in its intended direction, to one of the plurality of slave devices.

5. The method of claim 1, further comprising:
   allowing a subsequent digital signal to be communicated from the master device, to an isolation channel configured to isolate the subsequent digital signal in its intended direction, to one of the plurality of slave devices after a predefined number of bits of the isolated digital signal is transmitted.

6. The method of claim 3, wherein determining the completion of the read transaction comprises analyzing the bits of the digital signal to determine a transmission of a 16-bit read field.

7. One or more integrated circuit device having a process embodied in said integrated circuit device, said process performing a method of communicating and isolating a digital signal across an interface between a master device and a plurality of slave devices, the method comprising:
 receiving the digital signal at the interface;
 analyzing the digital signal to determine an occurrence of a read or a write transaction to determine an intended direction of the digital signal;
 upon determining an occurrence of a read transaction, transmitting the digital signal from one of the plurality of slave devices to an isolation channel configured to isolate the digital signal in the intended direction
 isolating the digital signal at the isolation channel; and
 transmitting the isolated digital signal in the intended direction of the digital signal to the master device.

8. The one or more integrated circuit device of claim 7, wherein analyzing the digital signal to determine an occurrence of a read or a write transaction comprises analyzing the bits of the digital signal.

9. The one or more integrated circuit device of claim 7, wherein said process performs the further method of:
 determining a completion of the read transaction;
 resuming a default state in which subsequent digital signals are sent from the master device to an isolation channel configured to isolate the subsequent digital channels in their intended direction;
 isolating the subsequent digital signals at the isolation channel;
 transmitting the isolated, subsequent digital signals to at least one of the plurality of slave devices; and
 continuing the default state until occurrence of a read transaction.

10. The one or more integrated circuit device of claim 7, wherein said process performs the further method of:
 allowing a subsequent digital signal to be communicated from the master device, to an isolation channel configured to isolate the subsequent digital signal in its intended direction, to one of the plurality of slave devices.

11. The one or more integrated circuit device of claim 7, wherein said process performs the further method of:
 allowing a subsequent digital signal to be communicated from the master device, to an isolation channel configured to isolate the subsequent digital signal in its intended direction, to one of the plurality of slave devices after a predefined number of bits of the isolated digital signal is transmitted.

12. The one or more integrated circuit device of claim 9, wherein determining the completion of the read transaction comprises analyzing the bits of the digital signal to determine a transmission of a 16-bit read field.

13. An isolator component for communicating and electrically isolating a digital signal between a master device and a plurality of slave devices, the isolator component comprising:
 bi-directional communication ports for transmitting and receiving the digital signal between the devices;
 direction detection/control logic for determining an intended direction of the digital signal by monitoring an occurrence of a read or a write transaction; and
 uni-directional isolator channels for isolating the digital signal upon determination of the intended direction of the digital signal, wherein the direction detection/control logic transmits the digital signal to an isolator channel configured to operate in the intended direction of the digital signal.

14. The isolator component of claim 13, wherein the direction detection/control logic determines an occurrence of a read or a write transaction by analyzing the bits of the digital signal.

15. The isolator component of claim 13, wherein the isolated digital signal is transmitted to a receiving device through a bi-directional communication port connected to the receiving device.

* * * * *